US008350594B2

(12) United States Patent
Karczmarek et al.

(10) Patent No.: US 8,350,594 B2
(45) Date of Patent: Jan. 8, 2013

(54) HARDWARE SYNTHESIS FROM MULTICYCLE RULES

(75) Inventors: Michal Karczmarek, Fremont, CA (US); Arvind Mithal, Arlington, MA (US); Muralidaran Vijayaraghavan, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 497 days.

(21) Appl. No.: 12/614,771

(22) Filed: Nov. 9, 2009

(65) Prior Publication Data

US 2010/0117683 A1   May 13, 2010

Related U.S. Application Data

(60) Provisional application No. 61/112,742, filed on Nov. 8, 2008, provisional application No. 61/258,286, filed on Nov. 5, 2009.

(51) Int. Cl.
*H04J 3/16* (2006.01)

(52) U.S. Cl. ............. 326/93; 370/252; 716/100; 703/14

(58) Field of Classification Search .................... 326/93; 703/14, 15; 716/100, 101; 327/400, 199, 327/355; 370/252, 466, 503
See application file for complete search history.

(56) References Cited

U.S. PATENT DOCUMENTS

| 5,541,850 | A | 7/1996 | Vander Zanden et al. |
| 5,905,664 | A | 5/1999 | Ko et al. |
| 6,099,577 | A | 8/2000 | Isobe |
| 6,275,973 | B1 | 8/2001 | Wein |
| 6,597,664 | B1* | 7/2003 | Mithal et al. ................... 370/252 |
| 6,901,055 | B1 | 5/2005 | Hoe et al. |
| 6,977,907 | B2* | 12/2005 | Mithal et al. ................... 370/252 |
| 7,289,946 | B1 | 10/2007 | Lee |
| 8,108,810 | B2* | 1/2012 | Hoe et al. ....................... 716/103 |
| 2005/0254436 | A1* | 11/2005 | Hoe et al. ....................... 370/252 |

(Continued)

FOREIGN PATENT DOCUMENTS

EP           0329233         8/1989

(Continued)

OTHER PUBLICATIONS

Wu et al., "A Synthesis Method for Mixed Synchronous/Asynchronous Behavior," Proceedings of European Design and Test Conference, Feb. 28-Mar. 3, 1994, pp. 227-287.

(Continued)

*Primary Examiner* — Daniel D Chang
(74) *Attorney, Agent, or Firm* — Occhiuti Rohlicek & Tsao LLP

(57) ABSTRACT

Enabling scheduling of single cycle as well as scheduling multi-cycle rules in a synchronous digital system whose behavior is governed by an asynchronous system specification (e.g., a TRS) provides a way to allow complex actions at state transitions of the asynchronous system without requiring that the complex actions be synthesized in logic that must be performed in a single clock cycle. For example, a relatively infrequent action may include a critical timing path that determines the maximum clock frequency of the system. By allowing that infrequent action to take multiple clock cycles, even if that action takes more absolute time, other actions may take less absolute time by virtue of being able to operate the synchronous system at a higher clock rate. The overall system may then operate more quickly (e.g., as measured by the average number of rules applied per unit of absolute time).

10 Claims, 8 Drawing Sheets

U.S. PATENT DOCUMENTS

2009/0268628 A1* 10/2009 Hoe et al. .................. 370/252

FOREIGN PATENT DOCUMENTS

EP 0829812 10/1989

OTHER PUBLICATIONS

Dutt et al., "An Intermediate Representation for Behavior Synthesis," Proceedings of 27$^{th}$ ACM/IEEE Design Automation Conference, Jun. 24-28, 1990, pp. 14-19.

Arvind et al., "Using Term Rewriting Systems to Design and Verify Processors," IEEE Micro Special Issue, May/Jun. 1999.

Babb et al., "Parallelizing Applications into Silicon," MIT Laboratory of Computer Science, Apr. 1999.

Cook et al., "Formal Verification of Explicitly Parallel Microprocessors," Mar. 5, 1999.

Gupta et al., "Hardware-software Co-Synthesis for Digital Systems," Computer Science Laboratory, Stanford University, 1993.

Hoe et al., "Hardware synthesis from term rewriting systems," XP-001030153 (Dec. 1999).

Liao et al., "An Efficient Implementation of Reactivity for Modeling Hardware in the Scenic Design Environment," University of California at Irvine, 1997.

Matthews et al., "Microprocessor Specification in Hawk," 1998.

Poyneer et al., "A TRS Model for a Modern Microprocessor," MIT Computation Structures Group, Memo 408, Jun. 25, 1998.

Shen et al., "Design and Verification of Speculative Processors," MIT Computations Structures Group Memo 400(B), 1998.

Shen et al., "Modeling and Verification of ISA Implementations," , MIT Computations Structures Group Memo 400(A), 1998.

Shen et al., "Using Term Rewriting Systems to Design and Verify Processors," IEEE MICRO, vo. 19, No. 3, pp. 36-46, XP002179293 (May 6, 1999).

Subrahmanyam et al., "Automated Synthesis of Mixed-Mode (Asynchronous and Synchronous) Systems," AT&T Technical Journal, vol. 70, No. 1, pp. 111-124 (XP000234136) (Jan. 1991).

Windley, P., "Specifying Instruction-Set Architectures in HOL: A Primer," Brigham Young University 1994.

Windley, P, "Verifying Pipelines Microprocessors," Brigham Young University 1995.

* cited by examiner

HARDWARE SYNTHESIS FROM MULTICYCLE RULES

CROSS-REFERENCE TO RELATED APPLICATIONS

This application claims the benefit of U.S. Provisional Application No. 61/112,742, filed Nov. 8, 2008, and of U.S. Provisional Application No. 61/258,286, filed Nov. 5, 2009, which are incorporated by reference.

This application is related to U.S. Pat. No. 6,901,055, "SYNCHRONOUS CIRCUIT SYNTHESIS USING AN ASYNCHRONOUS SPECIFICATION," issued on May 31, 2005, and to U.S. Application Pub. 2006/0277021, titled "CIRCUIT SYNTHESIS WITH SEQUENTIAL RULES," published on Dec. 7, 2006, which are incorporated herein by reference.

STATEMENT AS TO FEDERALLY SPONSERED RESEARCH

This invention was made with government support under grant number CCF-0541164 awarded by the National Science Foundation. The government has certain rights in this invention.

BACKGROUND

This specification relates to circuit synthesis with multi-cycle rules.

An approach to circuit synthesis makes use of an asynchronous system specification to produce a detailed hardware description for a synchronous system, in particular, a clocked (synchronous) digital circuit that functions according to the asynchronous system specification. That is, any sequence of states traversed at clock times of the clocked digital circuit is guaranteed to be a complete (or sampled) sequence of states that may be traversed by the asynchronous system. A compiler can be used to accept the asynchronous system specification and automatically produce a corresponding synchronous circuit specification, for example, specified using the Verilog hardware description language (HDL). One such compiler that performs this task makes use of a Term Rewriting System (TRS) to specify the asynchronous system.

The TRS specification accepted by the compiler includes a set of rules, which are also referred to as guarded atomic actions. Each rule consists of a body and a guard. The body describes the execution behavior of the rule if it is enabled. That is, the body characterizes the change in the state of the system on application of the rule, where the state is defined by the values of storage elements of the system, such as registers or FIFOs. The guard (or predicate) of a rule specifies the condition that needs to be satisfied for the rule to be executable. A rule $R_i$ is written as rule $R_i$: when $\pi_i(s) \Rightarrow s := \delta_i(s)$ where $\pi_i(s)$ represents the guard and $s := \delta_i(s)$ represents the body of rule $R_i$.

One synthesis (i.e., compilation) approach generates combinational logic for each rule's predicate ($\pi$) and each rule's state update function ($\delta$). For each clock cycle of the synchronous system, a scheduler chooses one of the rules whose predicate is true (i.e., a rule that is "executable" or "enabled") and updates the state with the result of the corresponding update function ($\delta$). This process repeats in every clock cycle. Other synthesis approaches each makes use of a scheduler that can enable multiple rules in a single clock cycle, with the multiple rules being selected by the scheduler in such a way that the result is equivalent to a valid sequential application of a set of rules.

SUMMARY

In one aspect, in general, a method for designing a synchronous digital system includes accepting a specification of an asynchronous system specification (for example, including a specification of a Term Rewriting System, TRS), which includes a specification for each rule in a set of rules. The specification of each rule includes a specification of a guard that determines when the rule may be applied, and a specification of an action that may be performed as an atomic operation when the rule is applied. The specification of the asynchronous system specification is processed to form a corresponding specification of a synchronous digital system for operation according to a clock. The processing includes forming a specification of a scheduling circuit and specifications of circuits implementing each of the plurality of rules. The set of rules includes at least some multi-cycle rules, and for each of the multi-cycle rules, the specification of the circuit implementing the multi-cycle rule includes a specification of a circuit implementing the action for the rule in a manner that may require multiple clock cycles to complete its action. The specification of the scheduler includes logic for selecting rules to initiate according to guard values for the rules such that multiple multi-cycle rules may be active in one clock cycle.

In another aspect, in general, a method is used for designing a synchronous circuit according to definitions of atomic actions and constraints on allowable sequences of the atomic actions. For each of the actions, a logic circuit is determined for implementing the definition of the action. A logic circuit is determined for scheduling use of the logic circuits that implement the actions. The circuit for scheduling maintains the constraint on the allowable sequences of the atomic actions and in at least some clock cycles schedules use of multiple of the logic circuits for the actions. The logic circuit for implementing one of the actions is then modified by inserting or by removing a delay register on a signal path in the logic circuit, without requiring modification of the logic circuit for scheduling to maintain the constrain on allowable actions. The determined logic circuits for implementing the actions and the determined logic circuits for scheduling the actions are such that they permit inserting and removing of delay registers in the signal paths of the circuits for implementing the actions without violating the constraint on the allowable sequences of actions.

In another aspect, in general, a synchronous digital system includes a scheduling circuit, a set of state elements, and a set of rule circuits, each rule circuit being coupled to the scheduling circuit and to one or more of the state elements. The system is configured to operate according to a specification of an asynchronous system that includes a set of rules, each rule including a guard determining when the rule may be applied, and an action that may be performed as an atomic operation when the rule is applied. The set of rule circuits includes at least some multi-cycle rule circuits, and for each of the multi-cycle rule circuits, the circuit implements an action for the rule that requires multiple clock cycles to complete. The scheduling circuit includes logic for selecting rules to initiate according to guard values for the rules such that multiple multi-cycle rule circuits may be active in one clock cycle.

In another aspect, in general, a method for operation of a synchronous digital circuit includes, at each of a set of guard logic circuits, each of the guard logic circuits being associated with a corresponding action, accepting state values and determining a ready signal a representative of whether the action may be performed. At state update logic corresponding to each of the actions, a commit ready signal is determined to be representative of a condition that values determined by the update logic are ready to be committed to the state. At a scheduling circuit, at each clock cycle, the determined ready signals for the guard logic circuits and the commit ready signals from the update logic circuits are accepted and used to determine (a) signals representative of which of the actions are active, and (b) commit signals representative of whether results of completed actions to be committed as state values. The state is then updated according to the determined commit signals. The scheduling circuit may determine the signals representative of which rules are active such that at least some rules are active for multiple clock cycles to perform an action and multiple rules are active during at least some clock cycles.

In another aspect, in general, logic circuitry includes a set of data paths, each path being associated with a corresponding value. Each path is implemented as a tuple of signal paths including a first path representing the value, a second path representing an indicator of whether the value on the first path is valid, and a third path representing a change in the value. The logic circuitry also includes a set of functional elements, each element accepting one or more of the tuples of signal paths as inputs and providing one or more of the tuples as outputs. For instance, at least some of the functional elements include a clocked register element.

Aspects can have one or more of the following advantages.

Enabling scheduling of single cycle as well as scheduling multi-cycle rules in a synchronous digital system whose behavior is governed by an asynchronous system specification (e.g., a TRS) provides a way to allow complex actions at state transitions of the asynchronous system without requiring that the complex actions be synthesized in logic that must be performed in a single clock cycle. For example, a relatively infrequent action may include a critical timing path that determines the maximum clock frequency of the system. By allowing that infrequent action to take multiple clock cycles, even if that action takes more absolute time, other actions may take less absolute time by virtue of being able to operate the synchronous system at a higher clock rate. The overall system may then operate more quickly (e.g., as measured by the average number of rules applied per unit of absolute time).

By allowing introduction of (or removal of) registers into the specification of an action without modifying the functionality of the action, timing of actions can be modified simply without jeopardizing the proper implementation of the system.

In many synchronous systems, arbitrary insertion of delay registers will change the functionality of the system. Therefore, when addressing timing closure problems, it may be difficult to determine how a circuit can be modified with delay registers to achieve desired timing characteristics (e.g., reducing or increasing delay through signal paths) without changing the functionality of the system. Using one or more approaches described below for a synchronous digital circuit formed to operate according to a functional specification (e.g., specified as a TRS), delay registers can be added or removed to paths in logic sections that implement updates to the state of the system, or which determine whether certain actions can be taken. Because of the way in which these logic sections are synthesized to be related to the functional specification, the addition or removal of the delay registers is guaranteed to maintain the operation of the system according to the functional specification. For example, long slow paths can be broken with delay registers without having to verify that the overall system will continue to function according to the specification and without requiring other changes to compensate for the introduction of the delay register.

Performing a timing analysis in a manner that identifies specific rules as including critical timing paths allows a user to focus on revising specifications of particular rules, which can have impact on the achievable clock rate of a synthesized synchronous circuit.

Specifying signal paths through clocked logic using signal tuples that each includes an indicator that a value is valid, as well as an indicator that the value has or will shortly change, provides an efficient way of implementing multi-cycle circuits that have variable execution times (i.e., variable number of clock cycles). Although some conventional asynchronous circuit implementations may augment a value signal path with an indicator of validity of the value, in a clocked circuit augmenting the value signal path with both a validity indicator and a change indicator allows new values to the provided on each clock cycle, as well as allowing intervening clock cycles to not have valid value signals, for example, while a multi-cycle circuit evaluates a new valid value.

Other features and advantages of the invention are apparent from the following description, and from the claims.

DESCRIPTION OF DRAWINGS

FIG. 1 is a signal tuple logic implementation of a simple expression;

FIG. 2 is a signal tuple logic implementation of a register;

FIG. 3 is a signal tuple logic implementation of a conditional expression;

FIG. 4 is a signal tuple logic implementation of a loop;

DESCRIPTION

Figure 1:
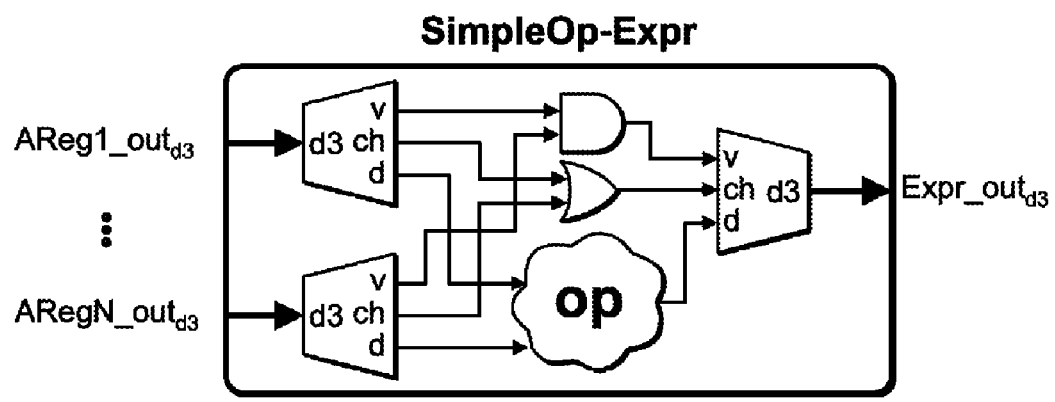
FIGS. 1 through 4 are examples of logic using signal triples that include changed and valid indicators.

Rule-based hardware synthesis has been successful in providing a designer with a methodology and a synthesis tool (e.g., a compiler) that can help eliminate functional bugs, for example, that are related to complicated race conditions in designs. Such a synthesis approach can provide a simple model with which the designer can reason about the correctness of his/her design. The rule-based synthesis model provides that all legal behaviors of the synthesized system can be explained in terms of some sequential and atomic firing of rules. A synthesis tool based on this approach has demonstrated that an RTL (register transfer language) hardware specification that is comparable in quality (e.g., in area and time) to hand-coded Verilog can be generated in this way. The techniques described in related U.S. Pat. No. 6,901,055, "SYNCHRONOUS CIRCUIT SYNTHESIS USING AN ASYNCHRONOUS SPECIFICATION," and U.S. Application Pub. 2006/0277021, titled "CIRCUIT SYNTHESIS WITH SEQUENTIAL RULES," provide examples of such approaches.

In general, it is desirable that the synthesized synchronous circuit executes as many rules as possible in each clock cycle to increase the average rate of rule execution per clocking period. However, it is also desirable to increase this rate (average number of rules executed per cycle) without incurring a substantial increase in the amount of circuitry required to implement the system or a substantial increase in the minimum clock period required to guarantee that signals will propagate through all paths of combinational logic in the clock period.

Approaches to addressing the technical goal of increasing the number of rules executed per clocking cycle and/or reducing the clock period generally include one or a combination of multiple of the following:

1. scheduling multiple rules in a single cycle that do not conflict in their access to storage elements of the state ("conflict free" rules);
2. scheduling multiple rules in a single cycle if their concurrent execution can be implemented to be equivalent to sequential atomic execution of those multiple rules ("sequentially composable" rules); and
3. scheduling a sequences of multiple rules (or any subset in sequence) effectively in a series of asynchronous (i.e., unclocked) phases of a single clock cycle of the synchronous system.
4. scheduling one or more rules for execution such that execution of a rule spans multiple clock cycles in a manner that is equivalent to execution of the rules as atomic operations in a single clock cycle.

The first two approaches are described in U.S. Pat. No. 6,901,055, "SYNCHRONOUS CIRCUIT SYNTHESIS USING AN ASYNCHRONOUS SPECIFICATION," which is incorporated herein by reference. The third approach is described in U.S. Application Pub. 2006/0277021, titled "CIRCUIT SYNTHESIS WITH SEQUENTIAL RULES," which is also incorporated herein by reference.

The fourth approach is described below. It should be understood however that in many embodiments, the approach described below is used in combination with the other approaches.

1 Signal Triples

Before proceeding with a description of the fourth approach, a technique that is used in a number of the embodiments is to define for any value signal x, which may be a single bit or more generally when synthesized represents a multiple bit value (such as a 32-bit integer) two associated Boolean signals: "valid x," represented as $x_V$, and "changed x," represented as $x_{Ch}$. In general, changed x becomes true at the same time that the value of x changes, for example, at the beginning of a clock cycle (or at the time it becomes known that the value will change), and valid x becomes true when logic that determines the signal x is guaranteed to have a value that is consistent with its inputs, for example, because there has been sufficient time for the inputs to propagate through combinational logic and registers that determines the value x.

A number of invariants follow from the definitions of these auxiliary Boolean signals. These include:

$$x(t) \neq x(t-1) \Rightarrow \neg x_V(t-1) \vee x_{Ch}(t)$$

which states that if x is changed from t−1 to t, then either x was not valid at time t−1 or $x_{Ch}(t)$ is true. Another invariant is:

$$\neg x_V(t) \Rightarrow x_{Ch}(t) \vee \neg x_V(t-1)$$

from which follows that if x was valid at t−1 but not valid at t, then x must have changed at t. A corollary is that if x was not valid at t−1, then we have no information about whether x is valid at t, or if it is changed at t.

The valid and changed signals can be propagates through combinational and clocked circuitry maintaining the semantic of the signals. That is, each signal value x is propagated as a signal triple $(x, x_{Ch}, x_V)$. For brevity, such as signal triple can be represented as $x_{d3} \equiv (x, x_{Ch}, x_V)$. The data portion, x, of the triple may also be denoted $x_d$ for clarity. Referring to FIG. 1, an example of propagation of such signal triples involves determination of an output Expr_out from a number of inputs AReg1_out through ARegN_out according to combinational logic 110, which implements an operation "OP." As shown in FIG. 1, signal triples AReg1_out$_{d3}$ 102 through ARegN_out$_{d3}$ though 104 are input and a signal triple Expr_out$_{d3}$ 106 is output. The values of the signals can be expressed as follows:

$$\text{Expr\_out}_d = \text{OP}(A\text{Reg1\_out } K \, A \, \text{RegN\_out});$$

$$\text{Expr\_out}_{Ch} = \vee_k A\text{Regk\_out}_{Ch};$$

$$\text{Expr\_out}_V = \wedge_k A\text{Regk\_out}_V.$$

Figure 3:
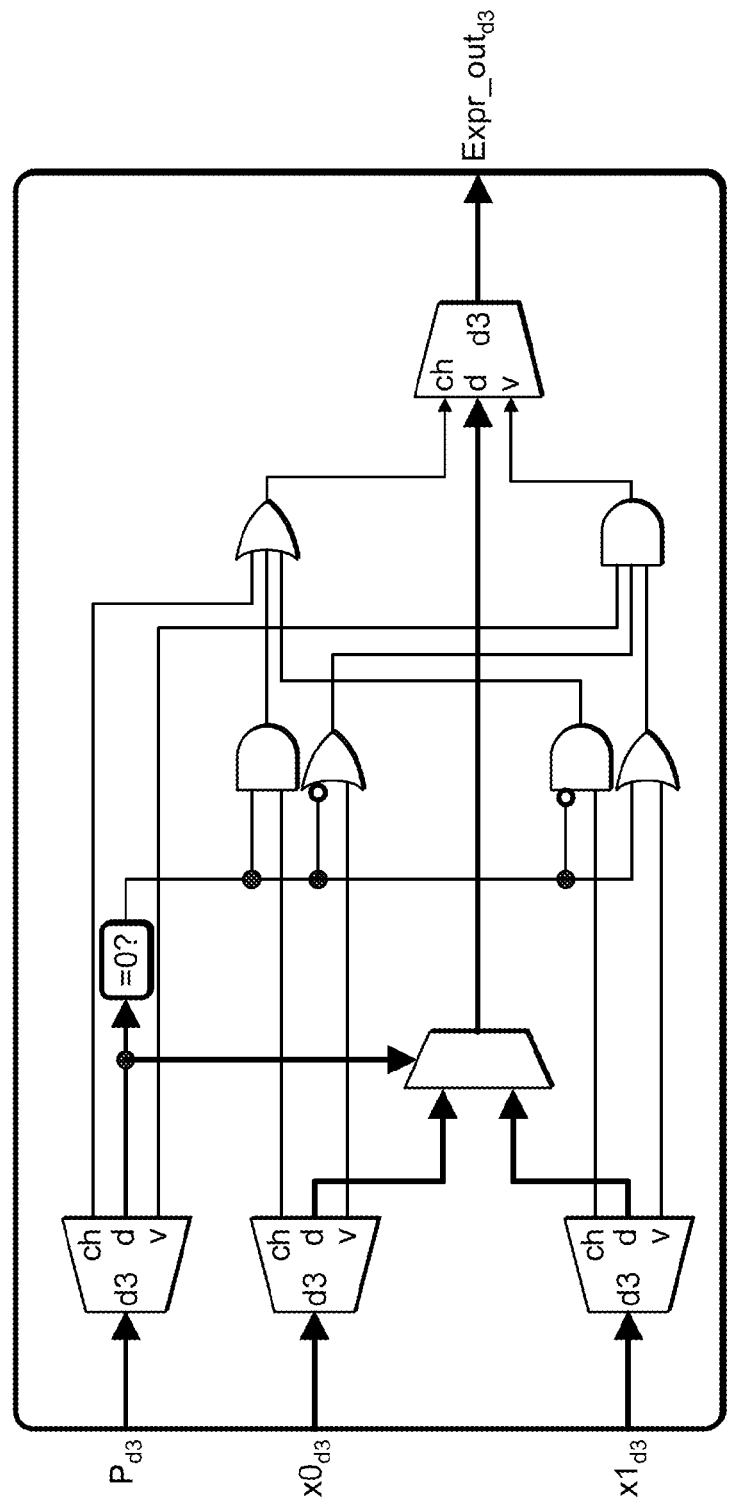

Referring to FIG. 3, another example of propagating signal triples implements a conditional, if (p=0) then Expr_out=x0 else Expr_out=x1.

Figure 4:
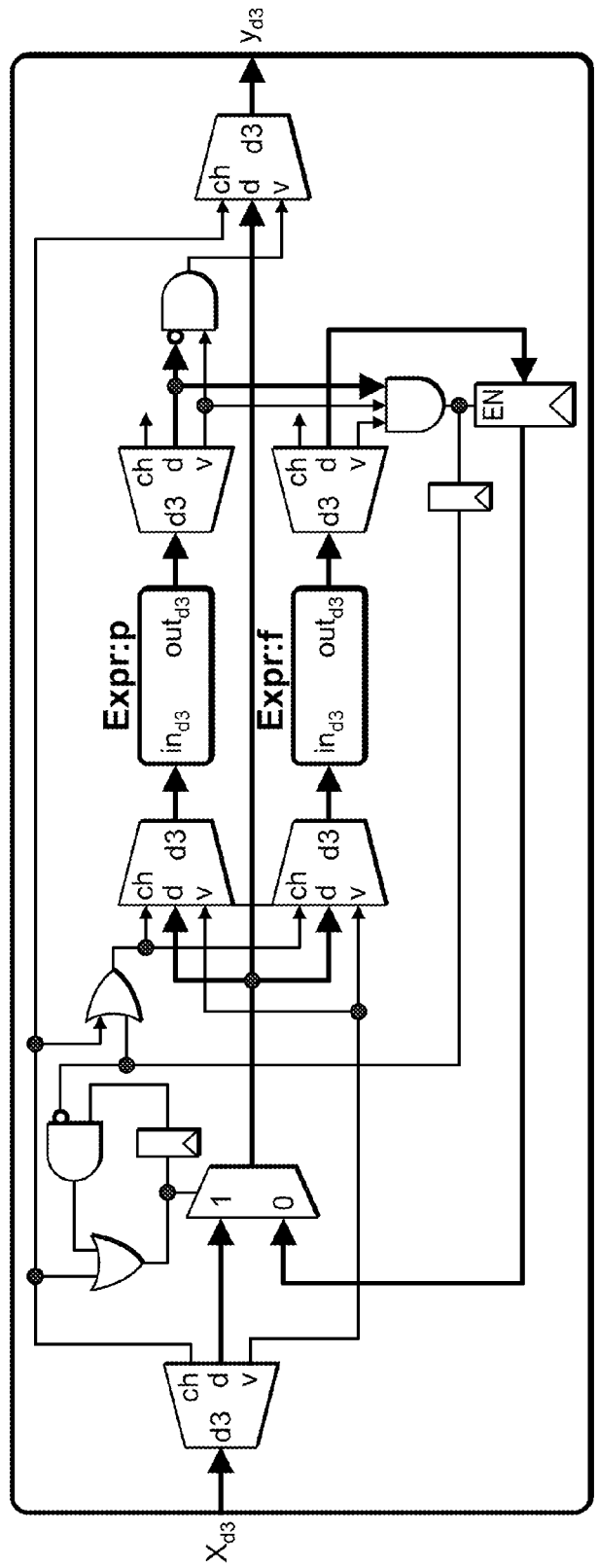

Referring to FIG. 4, in another example, signal triples are propagated through a circuit that requires a data-dependent number of cycles to complete. Specifically, the circuit implements a loop operation, which may be written as y=loop(x, f, p), which can be define recursively as loop(x, f, p)=if (p(x)) then loop(f(x), f, p) else x. Note that the implementations of f and p may themselves require multiple cycles, and their outputs are not considered in the loop until, at each iteration, their outputs become valid.

Figure 2:
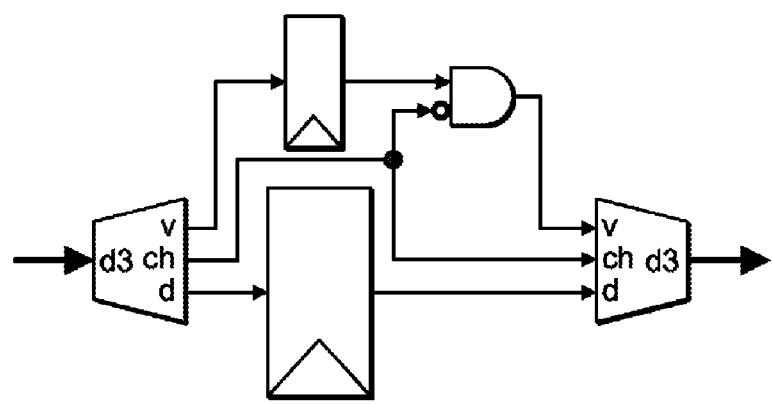

Referring to FIG. 2, the approach of propagating signal triples can also be used with delay registers. In FIG. 2, an input Reg_in$_{d3}$, for example, the output of an expression or operation as shown in FIG. 1, is clocked and available on the next clock as Reg_out$_{d3}$. The operation of the register can be expressed as follows:

$$\text{Reg\_out}(t) = \text{Reg\_in}(t-1);$$

$$\text{Reg\_out}_{Ch}(t) = \text{Reg\_in}_{Ch}(t);$$

$$\text{Reg\_out}_V(t) = \text{Reg\_in}_V(t-1) \wedge \neg \text{Reg\_in}_{Ch}(t-1).$$

Note that the "changed" signal propagates immediately from input to output, without delay through a clocked register, so that as soon as the input is changed, the output is marked as changed and invalid, and then is marked as valid on the next clock. Note that such a delay register can be inserted (or removed) on any path in combinational logic (optionally having such delay registers) without changing the function of the logic 2 Reference Scheduler Referring to FIG. 5A, an approach to scheduling multi-cycle rules makes use of the signal triple approach described above. As a general framework, which is consistent with the approaches described in "SYNCHRONOUS CIRCUIT SYNTHESIS USING AN ASYNCHRONOUS SPECIFICATION," a scheduler 530 determines which rule or rules (if any) to apply at each clock cycle. The specification of each rule is synthesized into rule logic 520, with each rule being separately synthesized (recognizing that with circuit optimization, rules may share logic after optimization). The system includes the architectural state 510 of the system. The term "architectural" is used in this context to refer to the state that is explicitly referenced by the rules (e.g., various storage elements, such as registers and FIFOs) and which is in general available to multiple rules. As discussed further below, the system has other state, for example, local state (e.g., local registers) associated with each multiple-cycle rule. State access logic 540 mediates access to the memory elements 511 for the architectural state 510, in some embodiments using multiplexing logic 541 corresponding to each memory element 511. The multiplexing logic 541 for a memory elements permits access to the element from multiple different rule logic sections 520 for different rules that access the memory element.

Figure 5A:
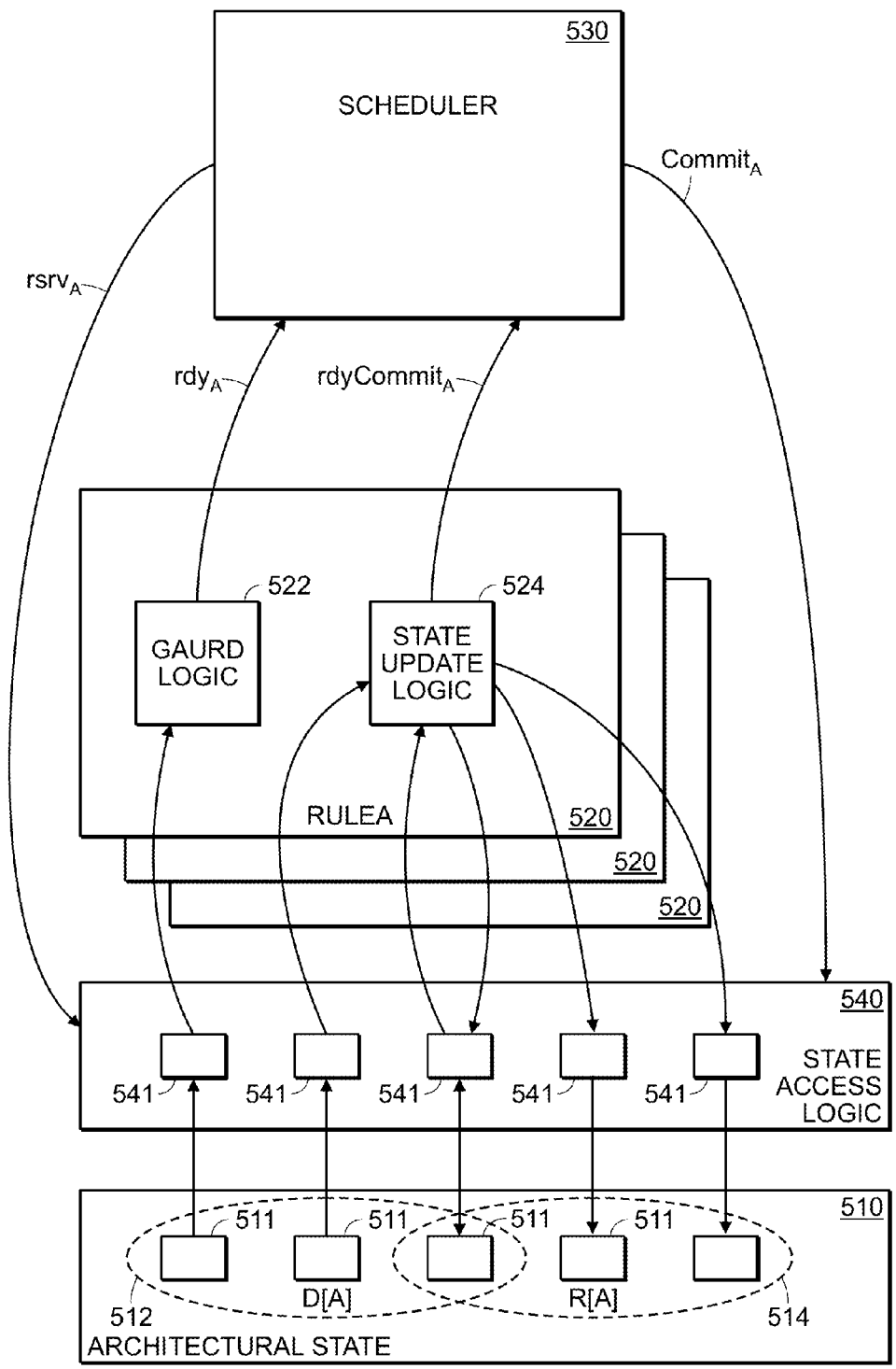
FIG. 5A is a block diagram of a synthesized synchronous system.

Continuing to refer to FIG. 5A, the digital system operates according to the specifications of the rules. As introduced above, each rule includes guard logic 522, for example, combinational logic that evaluates the guard, $\pi_A(s)$, which evaluates to true (i.e., binary 1) when the rule may be enabled by the value of the state, s. In FIG. 5A and in the discussion below, this guard value is referred as the "ready," or "rdy" output signal for a rule, for example, for rule A referred to as $\text{rdy}_A$.

Each rule also includes logic that is synthesized to compute the updated state values that may be committed to the architectural state 510 when the guard is true and the scheduler determines that that rule should be applied. Specifically, the state update logic 524 takes as inputs values from state memory elements 511 (also referred to as state elements) of the state 510 in the domain of the rule, denoted D[A] 512 for rule A, and determines values for state elements in the range of the rule, denoted R[A] 514.

Note that in FIG. 5A, links between the rule logic 520 for one rule ("rule A") and the scheduler 530 and the state access logic 540 are shown. Not shown for clarity are equivalent links between the rule logic 520 for each of the other rules of the system and the scheduler 530 and access logic 540. Furthermore, it should be understood that the illustration of links between the rule logic 520 and particular multiplexing logic elements 541 is intended to be representative. Each rule has its own particular connections between to memory elements of the state.

In systems in which the update logic for all rules requires only a single cycle, the scheduler can take as input the ready signals from all the rules, and based on these ready signals, select which rule or rules to commit in that cycle. In FIG. 5A, a commit signal passes from the scheduler 530 to the state access logic 540, indicating when the scheduler determines the state updates output from the active rule's update logic 524 should be committed to the state 510.

In the case of a system in which all rules have single-cycle implementations, a reference scheduler selects only a single rule on any single clock cycle, and asserts that selected rule's commit signal so that the rule's state update is committed to the architectural state on the next clock. A number of more complex scheduling approaches allow multiple rules to be applied and have their state updates applied in a single clock cycle.

In a first example involving multiple cycle rules, the guard logic 522 is implemented as in the case of single cycle rules. The state update logic, however, may take several cycles to evaluate a valid output. A reference scheduler takes the ready signals from all the rules, and selects a single rule to apply. The scheduler asserts a reservation signal for the selected rule. The rsrv signal stays asserted for the duration of the rule's processing, that is, through the cycle in which the commit signal is asserted for the rule.

In the case of a rule that is in fact a single-cycle rule, during the clock cycle in which the rsrv signal is asserted, the rule asserts a "ready to commit" signal, denoted "rdyCommit." Still within the same cycle, the scheduler asserts in turn a "commit" signal, which causes the state updates to be committed in the architectural state on the next clock (i.e., at the transition to the next clock cycle).

Figure 5B:
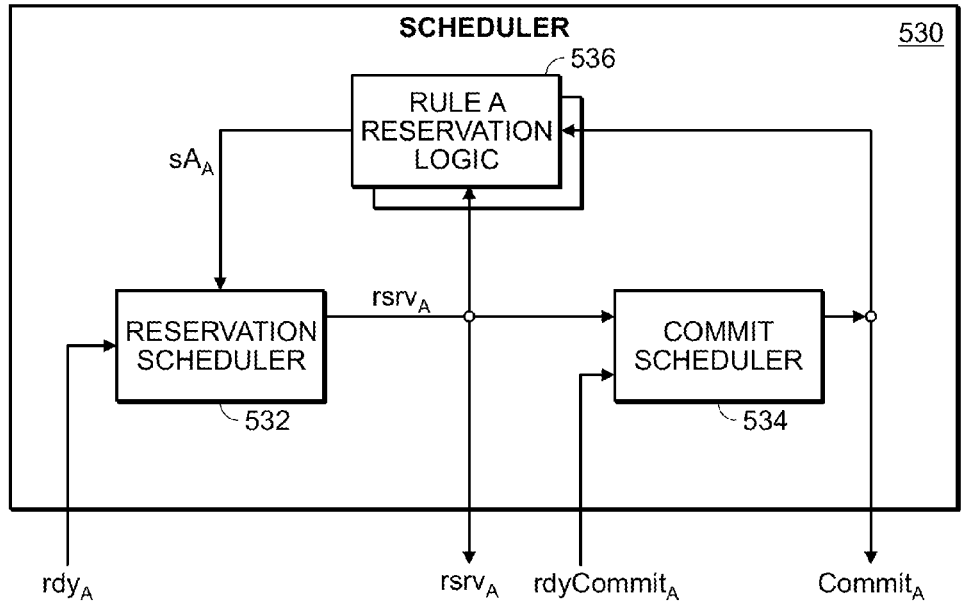
FIG. 5B is a block diagram of a scheduler.

Referring to FIG. 5B, in some embodiments of the scheduler 530 includes a reservation scheduler 532, a commit scheduler 534, and one instance of reservation logic 536 for each rule. In some embodiments, the reservation scheduler and commit scheduler are stateless, and the state representing which rules are active is in the reservation logic for the rules. Reservation logic 532 receives ready signals from each of the rules, illustrated with a single ready signal from rule A, and also uses "still active" (sA) signals for all the rules to determine which rule or rules to initiate with a reservation signal in the cycle. For example, in a reference scheduler in which only a single rule may be active at one time, the reservation scheduler waits until all the sA signals from the rule reservation logic 536 are false, and then asserts a single reservation signal for a rule. The rule reservation logic 536 for the rule that is selected asserts its sA signal on the next clock, which is maintained until the rule is committed.

The decision of which rule or rules to commit at a cycle is made by the commit scheduler 534. This decision is based which rules are active (i.e., rsrv is true) and which rule logic is asserting its ready commit signal. Circuitry associated with a rule asserts the ready commit signal based, typically based on an interval relative to when its inputs are valid. In some embodiments, the ready commit signal is determined by a counter that is set to the maximum number of cycles needed to determine valid outputs whenever the inputs are changed and/or signaled by the scheduler to start calculating the outputs of the rule, and counts down until the that number of cycles has elapsed. In some embodiments, including embodiments described below that make use signal triples including changed and valid signals, the duration needed to determine outputs of a rule may be data dependent (for example, because of loops or conditional elements in the rule) and/or require different unchanging intervals for different of its inputs, and the ready commit signal is generated based on such constraints.

The commit scheduler determines which rule or rules (which have asserted their rdyCommit signals) to commit and asserts those signals. These commit signals are passed to the respective reservation logic 536 to cause the rsrv signal to be deasserted when the rules outputs are committed. The rdyCommit signal, once it becomes true, remains so until the rule is committed.

Figure 6A:
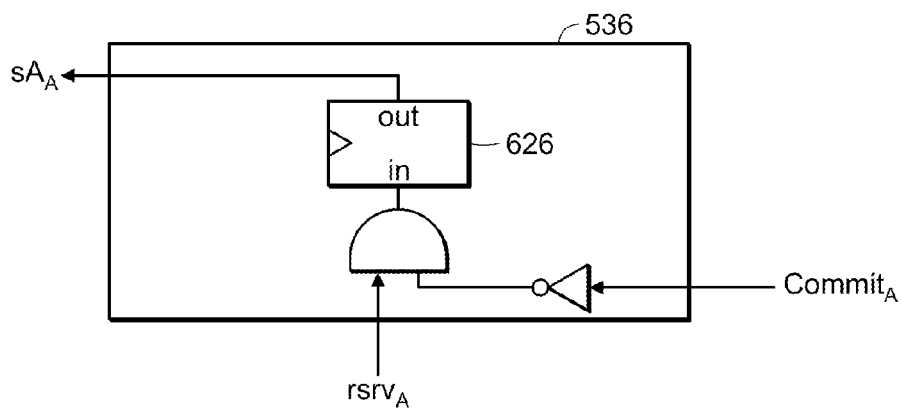
FIG. 6A is logic implementing reservation circuit.
Figure 6B:
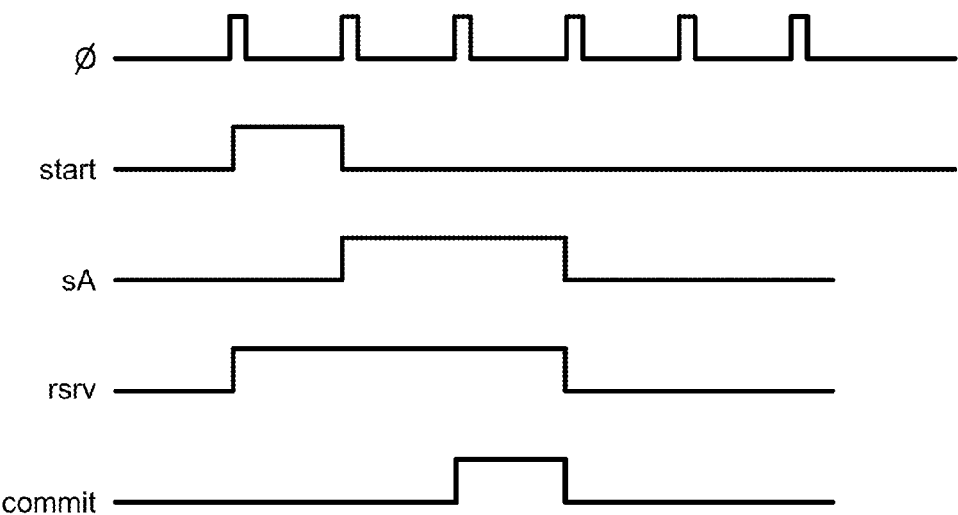
FIG. 6B is a timing diagram of exemplary reservation signals.

Referring to FIGS. 6A and 6B, in some embodiments in which a rule that requires multiple cycles to evaluate its state update values, the scheduler does not start any other rules until the active rule has completed its evaluation and the results have been committed. The rule includes reservation logic 536, which accepts the "rsrv" signal for the rule, and generates a "still active" signal denoted "sA," which is true on a second and any subsequent cycle that the rule is active. An example of reservation logic 536, shown in FIG. 6A, uses a register 626 to maintain a local state variable that is true from the second cycle in which the rule is active. The still active signal is then fed back to the reservation scheduler and is reset on the clock in which the rules state updates are committed to the architectural state. In this reference schedule, the reservation scheduler uses the sA signal from the rule to inhibit scheduling of other rules while the started rule is still active. Referring to FIG. 6B, an example of timing of reservation signals for a rule that takes three cycles to complete has a start signal asserted by the scheduler on the first cycle in which its inputs are ready, the rsrv signal asserted in the first through third cycles, and the still active (sA) signal asserted on the second and third cycles. The rule's reservation logic asserts the ready commit signal, for example, based on a counter that counts the three cycles needed to determine the outputs, and the reservation logic asserts commit signal asserted in the third (or later) cycle, which causes the rsrv signal to be deasserted on the fourth cycle (assuming that the reserve cycle is not again asserted on the forth cycle to immediately restart the rule for a further invocation).

Figure 5C:
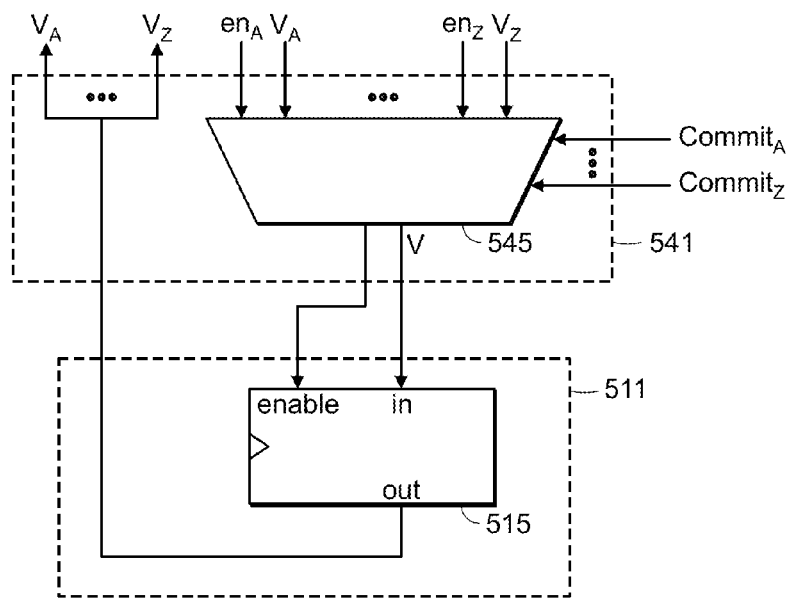
FIG. 5C is a diagram of access and register logic.

Referring to FIG. 5C, an example of an instance of multiplexing logic 541 and a corresponding memory element 511 accepts and provides signals from and to multiple rules for setting and accessing the value of a register 515 of the memory element. In this example, each link between the state update logic 524 (not shown) and the multiplexing logic 541 represents two related signals: an enable signal and a value signal (which may itself have multiple data lines). The state update logic of a rule asserts the enable signal if the value signal should be used to update the state when the rule's commit signal is asserted. For example, the state update logic may include a conditional term such that, based on state values, the register may or may not be updated. In FIG. 5C a multiplexor 545 receives the pairs of enable and value signals from the rules of the system, illustrated as rules A through Z. When the commit signal for a rule is asserted, the corresponding pair of enable and value signals are passed via the multiplexor 545 to the enable and value inputs of the register 515. If the enable is asserted, the register value is updated on the next clock. The output value of the register 515 is provided directly to any rule that requires the value.

Figure 7:
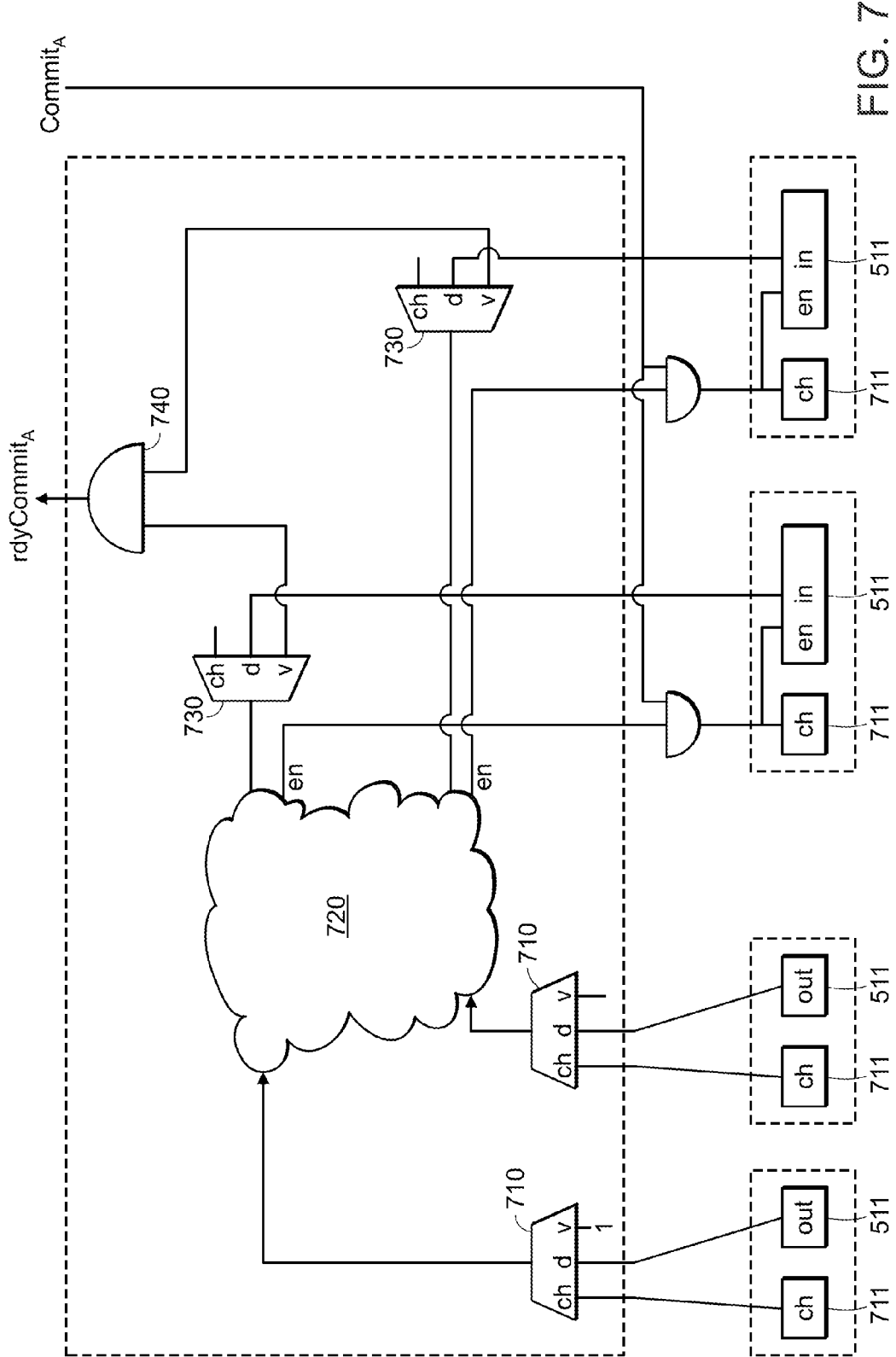
FIG. 7 is a block diagram of state update logic for a rule.

Referring to FIG. 7, some embodiments of the state update logic 524 for a rule use signal triples as described above, and for each register 511 in the architectural state, the architectural state includes a change register 711, which is a one-bit register that is asserted for one clock cycle when its corresponding register is changed. In the example in FIG. 7, signal triples propagate as described above through a core section 720 of the state update logic. The change register signal is used to assert the "changed" signal for the inputs to the update logic, as illustrated in the input multiplexors 710, which accept the input data values from the domain D[A] 512 of the rule. As a result of the "changed" signals being asserted on the input, the core section 720 sets the "valid" signal for the output values to false until the output values have been recalculated. When the rule is reserved, no other rule can change the values in the domain of the rule, and therefore the "changed" signal remains false while the outputs are being calculated. Once all the state update values are valid, the logic 740 asserts the ready commit signal to the scheduler. When the scheduler in turn asserts the commit signal for the rule, that commit signal is ANDed with the enable signals generated by the update logic 720 to determine write enable signal the elements in the range R[A] 514 of the rule. For those elements that are enabled to be updated, the corresponding change register is set true for the first cycle of the newly updated value.

Note that in the case of the core section 720 having no registers, for example, as an expression shown in FIG. 1, "ready commit" is always true, because the output values can be committed on any clock cycle chosen by the scheduler.

Referring again to FIG. 5A, in some embodiments the rsrv and/or commit signals are passed (not shown in FIG. 5A) from the scheduler to the rule's state update logic 524 to indicate that the logic is to initiate the evaluation of the state update values for that rule. In some embodiments, other implementations of multicycle actions than described above can be used. For example, rather than using signal triples to propagate change and valid signals through the logic, other implementations can be used with the same type of external interface. For example, state update logic may be implemented at least in part using an instruction processor, which is initiated according to the rsrv signal from the scheduler, and which does not assert the ready commit signal until it has computed the updated state values. In some embodiments, the same instruction processor can be used to (non-currently) execute the actions of different rules, as long as they are not scheduled to be active at the same time.

In some embodiments, power savings can be achieved by deactivating combinational logic that is not active. For example, state update logic 524 may be powered off or set to a reduced power states during periods when its corresponding rsrv signal is not asserted. In some examples, the scheduler is responsible for maintaining the power state of the rules' state update logic, for example, powering up the logic when the rule may be scheduled, and then starting the rule only after an operational power state is achieved. The figures show an aggressive compilation strategy where logic executes (i.e., the internal values continue to be updated as the architectural state changes and as those changes propagate through the logic) as soon as possible. On the other hand, it is acceptable to delay computations until a rule receives a reservation. Such a delay has no impact on the correctness of the operation of the system. But such delay of execution until a rule is reserved may impact power consumption, for example, by avoiding logic transitions on signal lines.

3 Read Throughout Scheduling

In the reference scheduler for multi-cycle rules, the inputs to the rule are held unchanged for the duration of the execution of the rule because no other rules are active. Therefore, if the guard evaluates to true at the first cycle of the rule, it is guaranteed to remain true through the last cycle of evaluation of the rule. Similarly, the inputs to the state update logic remain true, and therefore the computation of the outputs does not have to be restarted once the reservation signal is asserted. Note that from a scheduling point of view, if a rule's guard is true at time t, the output of a rule is committed at time t, then no new behavior can be introduced by the fact that the guard has been true since t−k+1 for a k cycle rule, or that its inputs have been unchanged during the interval [t−k+1,t].

A class of scheduling approaches that allows application (including ongoing application of unfinished multiple cycle rules) of multiple rules guarantees that once started, the inputs to the rule (i.e., the state variables in D[A]) will not be changed until after the commit signal is provided to the rule. This constraint is referred to as the "Read Throughout" policy, which means that a rule can read its inputs in any cycle that it is active.

One example of scheduling multi-cycle rules (or more particularly, rules that may include at least some rules that require more than one cycle to complete), uses a Conflict Free (CF) scheduling approach as described in "SYNCHRONOUS CIRCUIT SYNTHESIS USING AN ASYNCHRONOUS SPECIFICATION." Generally, two rules A and B are conflict free (denoted "A CF B") if and only if their ranges do not overlap, and the range of each rule does not overlap with the domain of the other rule. This can be expressed as:

$$(D[A] \cap R[B] = \emptyset) \wedge (D[B] \cap R[A] = \emptyset) \wedge (R[A] \cap R[B] = \emptyset).$$

In a conflict-free scheduling approach, a scheduler can assert a reservation signal for a rule R at time t, as long and that rule does not conflict with any other rule that is being started at that cycle, and that rule does not conflict with any rule that is still active having been started at a previous cycle.

Another example of scheduling multi-cycle rules uses the sequential composability property of rules as discussed in detail in "SYNCHRONOUS CIRCUIT SYNTHESIS USING AN ASYNCHRONOUS SPECIFICATION." In a slightly more restrictive definition than previously presented, two rules, A and B, are "sequentially composable" (denoted "A<B") if the range of B overlaps the domain of A, but the range of A does not overlap the domain of B, therefore application of rule A cannot change rule B's guard or state update values, and the range of A does not overlap with the range of B, which avoids conflict in updating the state in execution of the two rules. This condition can be expressed as $$(R[A] \cap (D[B] \cup R[B]) = \emptyset) \wedge (D[A] \cap R[B] \neq \emptyset).$$

Very generally, in the single-cycle case, this allows a scheduler to independently apply both rules A and B in a single cycle, and have the effect be equivalent to sequential atomic application of rule A followed by rule B.

Two rules A and B are referred to as "conflicting" (denoted "A < >B") if and only if they are neither conflict free nor sequentially composable in either order, which can be expressed as:

$$\neg ((A \text{ CF } B) \vee (A<B) \vee (B<A)).$$

An example of a multi-cycle implementation of a scheduler that takes advantage of concurrent execution of sequentially composable rules follows the following scheduling invariants:
1. if A< >B, a reservation for A cannot be issued if B already holds a reservation.
2. if A<B, B cannot commit while A is active and is not scheduled to commit in the same cycle as A.
3. if A<B, a reservation for A cannot be issued if B is already active from a previous cycle.

Note that these invariants provide correct operation, but that there may be even more efficient invariants that allow more rules to execute concurrently. Without intending to be limited by the motivation for specification of these invariants, the following comments may be helpful.

Invariant 1 avoids concurrent scheduling of conflicting rules, which would effectively lead to atomicity violation. Rather, conflicting rules are executed one after another.

Sequentially composable (SC) rules are characterized by having one rule read the output of the other, but not vice versa. When executing SC rules, it is sometimes necessary to keep a rule active longer (delay its commit) than the minimum number of cycles. That is, the rule may assert its ready commit signal, but the scheduler must delay in turn asserting the commit signal. This situation can be referred to as "rule stretching," which is embodied in invariant 2.

In "SYNCHRONOUS CIRCUIT SYNTHESIS USING AN ASYNCHRONOUS SPECIFICATION," a set of rules that forms a cycle according to the sequentially composable property cannot all be scheduled in a single cycle. A solution is to effectively remove one of the possible sequential composability properties between two of the rules to destroy the cycle. In the multi-cycle rule context, a similar situation can exist, with the complication that the rules that are active in a cycle may have been started in different cycles. If an entire cycle of rules is started, there may not be any acceptable sequence of committing of those rules, and therefore a livelock situation may occur. Invariant 3 effectively guarantees (but may not be the least restrictive condition) that a set of active rules does not form a cycle than cannot be committed.

In some examples, the scheduler 530, operates according to the invariants described above to interact with the rules as illustrated in FIG. 5A. As part of the circuit synthesis procedure, the compiler has computed the conflict properties for each pair of rules. The scheduler implements two procedures: RuleSelectReserve and RuleSelectCommit, which correspond to the reservation scheduler 532 and the commit scheduler 534, respectively, shown in FIG. 5B. The RuleSelectReserve procedure generates the rsrv signal and requires the sA and rdy signals from the rules, while the RuleSelectCommit procedure generates the commit signals and requires the rdyCommit signals as well signals that define the set of active rules, that is, rules holding reservations, generated by RuleSelectReserve in the form of the signals from the rules.

In order to set $rsrv_A$ at time t the scheduler makes sure that 1. $rdy_A(t)$ is true; and 2. A does not conflict with the rules that have already been reserved. The rules are examined in the decreasing order of urgency, which is a static priority ordering of the rules. The following procedure builds the set of active rules AR and a set of non-active rules NA:

Procedure RuleSelectReserve:

1. Initially $AR = \{A \mid sA_A(t)\}$ and $NA = R - AR$
2. $\forall A \in AR : rsrv_A(t) = \text{true}$
3. repeat while $NA \neq \emptyset$
   3.1 Let $A$ be the most urgent rule in $NA$.
   3.2 $rsrv_A(t) = rdy_A(t) \wedge \left( \bigwedge_{B \in AR} \neg ((A <> B) \vee (A < B)) \right)$
   3.3 $NA = NA - \{A\}$
   3.4 if $rsrv_A(t)$ then $AR = AR \cup \{A\}$ Step 3.2 of the algorithm above preserves Invariants 1 and 3. As a consequence the rules in AR will form a partial order over the sequentially composable (<) relation.

In order to compute $commit_A(t)$ the scheduler makes sure that
1. $rsrv_A(t)$ is true;
2. $rdyCommit_A(t)$ is true and
3. committing A would not violate Invariant 2, that is, there is no rule B holding a reservation such that B<A.

The procedure uses the set AR computed above and a set CR, which is the set of rules that are active and ready to commit. The scheduler examines the rules in CR in an order defined by sequential composability (<) and decides for each rule whether it should be allowed to commit:

Procedure RuleSelectCommit:
1. Initially $CR = \{A \mid rsrv_A(t) \wedge rdyCommit_A(t)\}$ and $AR = \{A \mid rsrv_A(t)\}$;
2. $\forall A \in R - CR : commit_A(t) = \text{false}$;
3. Repeat while $CR \neq \emptyset$
   3.1 Select $A \in CR$ such that there does not exist $B \in CR$: B<A;
   3.2 $commit_A(t) = t$ there does not exist $B \in AR$:(B<A);
   3.3 $CR = CR - \{A\}$;
   3.4 if $commit_A(t)$ then $AR = AR - \{A\}$ It is important to note that this algorithm is well defined (deadlock free) only if the (<) relation is a partial order on CR. This is not true in general but is true for active rules because of Invariants 1 and 2 and because CR is a subset of AR.

These algorithms are compiled into pure combinational logic for a given set of rules using the knowledge of the (<>) and (<) relation among rules, which is known at compile time.

One point should be made about the efficiency of this RuleSelectCommit procedure. Even though the RuleSelectCommit procedure is efficient—it generates its output in a single pass over the set CR—it can potentially generate a large amount combinational logic because of step 3.1. This step essentially requires a topological sort of any subset of rules based on the (<) relation.

In some embodiments, a simplified version of the algorithm that sometimes may not commit as many rules every cycle as theoretically possible is used but that generates substantially less combinational logic. The simplification of the algorithm is based on the fact that the rules in step 3.1 can be examined in any order, that is, we can ignore the (B<A) check without the loss of correctness. So instead of checking rules according to the (<) relation, we can check the rules in an urgency order, which is very efficient to implement in hardware.

4 Specification of Multi-Cycle Rules and Timing Analysis

In some embodiments, the specification of an asynchronous system is as described in "SYNCHRONOUS CIRCUIT SYNTHESIS USING AN ASYNCHRONOUS SPECIFICATION," with the additional use of a delay primitive, delay(x). That is, a user can explicitly introduce the use of delays in the action specification of a rule, which can result in state update logic for certain rules taking more than one cycle, for instance, by implementing a one-cycle delay for each inserted delay primitive. Functionally, this primitive is treated as an identity, delay (x)=x. The circuit synthesis compiler, however, treats this primitive as an indicator that a local delay register is to be synthesized in the state update logic for the rule. In some examples, a register of the form shown in FIG. 2 is inserted.

In some embodiments, after synthesis of the synchronous circuit, a static timing analysis is performed on the synthesized circuit, which determines the critical paths through the circuit which determine the maximum clock rate at which the circuit can operate. In some cases, a critical path is associated with state update logic 524 associated with a particular rule, and the timing analysis tool identifies that rule to the user. For example, the rule as initially specified does not include any delay( ) primitives, and therefore is synthesized to act in a single clock cycle.

When the timing tool identifies a rule as having a critical timing path in its synthesis, the user has the option of updating the specification of the action of the rule to introduce one or more delay( ) primitives. Introducing these primitives does not change the functionality of the system, and does not introduce any new behavior of the system that was not previously allowed by the specification of the asynchronous system (noting that the synchronous synthesis does not generally enable all behaviors, and therefore, introduction of the registers may in fact remove some possible behaviors of the previously synthesized synchronous system and/or introduce new ones). However, when the newly defined system is re-synthesized, the goal is for the introduction of the delay primitives to have removed a critical timing path in that rule.

In another timing application, an initial design may be synthesized using a number of delay registers. Static timing analysis can then be used to identify which of the delay registers can be removed without violating the timing constraints of the circuit. For example, the minimum clock frequency can be used as a constraint to identify which delay registers can be removed while still being able to achieve the required clock frequency.

In some embodiments in addition to a timing analysis, an execution simulation is performed, thereby providing an indication of how often a particular rule is executed. Using the timing information and rules' frequency of use information, which may be presented to the user in an integrated development environment in which the source specification of the rules is annotated with timing information, the user can select which rules to re-specify using delay primitives.

In some embodiments, the circuit synthesis tool is automated so that it uses the timing analysis data to automatically suggest points in the specification at which to introduce delays, or to synthesize the rules while introducing delay registers without the user's intervention.

In some embodiments, there may be a tradeoff between the number of cycles needed to execute a rule's action and the size or power required to implement the action. For example, in some situations, a one-cycle implementation of an action may require more power and/or logic gates than a multi-cycle implementation. In some embodiments, size or power constraints can be manually, automatically, or semi-automatically achieved by introduction of registers into the action implementation.

5 Multi-Cycle Memory Elements

In the description above, updates to the architectural state 510 are carried out in a single clock cycle. For example, once a rule computes state update values, the scheduler is free to signal the rule to commit the updates, and the update logic passes commit signals to the memory elements in the state, thereby making those values available to other rules on the next clock cycle.

In some embodiments, the signal line passing between each rule's logic 520 and the scheduler 530 and state access logic uses a signal triple (changed, data, valid), and the guard logic 522 and state update logic 524 are implemented using signal triples. In some cases, the signal values provided from the architectural state to a rule's guard logic may not be valid on a particular cycle, and therefore, the scheduler waits from a rule's ready signal to be both valid and true. Similarly, the scheduler waits for a rule's ready commit signal to be both valid and true before potentially committing the rule. Note that this permits implementations of guard logic that require multiple cycles to determine. For example, whenever the inputs to such guard logic change, the ready signal becomes invalid until the guard logic has had the time to determine whether the guard value is true.

In some embodiments, multi-cycle behavior is extended to some or all of the memory elements of the architectural state 510. For example, after committing the value to a register, the output of the register may not be available (i.e., valid) for some number of cycles.

In some embodiments, multi-cycle modules are used in the implementation of the architectural state. One aspect of such modules is that in some implementations, even if a module requires multiple cycles to commit a value from the time the value is available to the module, the value can be made available to the module in cycles prior to the commit signal for a rule, thereby reducing the lag from the time the rule is committed to when the state is updated and available to be used by other rules. For example, in some implementations, the module provides a ready commit signal to the rule so that when the commit signal is generated by the commit scheduler, the module is in fact in a position to immediately commit the result and be available for further access by other rules.

Figure 8A:
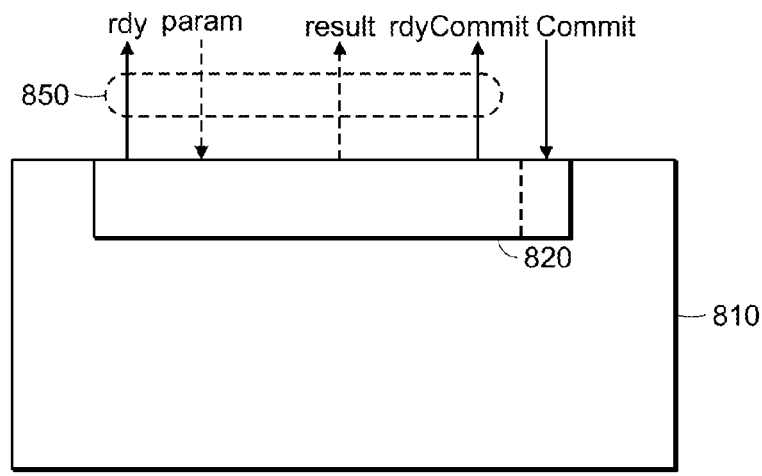
FIG. 8A is a block diagram of a multi-cycle module.

In some implementations, a multi-cycle module is a memory element that has one or more interfaces, each implementing a "method" of the module. Referring to FIG. 8A, an example of a module 810 is illustrated with a representative method interface 820 (in general, a module has multiple such interfaces). One type of interface 820 implements a value method, which is a method of accessing a value in the state of the module without changing its underlying architectural state. As an example, if the module represents a simple register, the value method provides a way of accessing a value. As another example, if the module is a register file, then the value method provides a way of access the value in one of the registers.

In general, an interface to a value method 820 has a ready (rdy) output that indicates that the method is available to be accessed. Optionally, a rule can also provide a parameter (param), which modified the value being returned. In the example of a register file, the parameter may be the address of the register to be read. The result output provides the accessed value.

Note that, in some embodiments, each of the inputs and outputs of the interface is implemented as a signal triple. For example, the result may not be valid for a number of clock cycles if a read cannot be accomplished within the same clock cycle that the parameter is provided, and therefore the valid signal is delayed for a number of cycles.

In general, an interface 820 to an action method has, in addition to the inputs and outputs for a value method, a ready commit (rdyCommit) signal is asserted when the interface is able to commit the result of the action to the architectural state. The scheduler can then assert the commit input, which causes the architectural state to be updated on the next cycle.

Figure 8B:
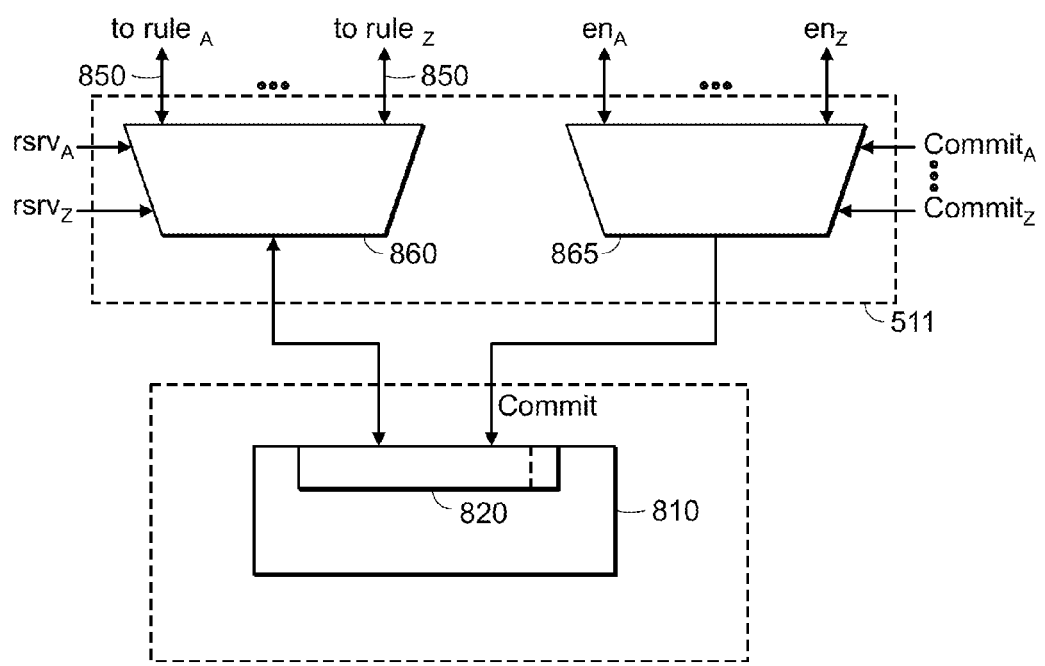
FIG. 8B is a block diagram of multiplexor logic for a multicycle module.

Referring to FIG. 8B, in some examples, multiplexing logic 541 for modules differs somewhat from the logic shown in FIG. 5C for a register embodiment. In FIG. 8B, a bidirectional multiplexor 860 passes the inputs and outputs of the interface 820 (other than the commit signal) to the rule that has its rsrv signal asserted. The scheduler is configured such that for any module interface, only a single rule that accesses that interface is active at any one time. The ready commit signal passes to the rules state update logic so that the rule does not assert its ready commit signal to the scheduler until the modules it needs to commit are also ready. When the commit signal is asserted for the active rule, the enable signal for the reserved rule is passed through a second multiplexor 865 to the commit input of the interface.

6 Implementations

In some embodiments, the approaches described above are implemented in software (e.g., including instructions for controlling operation of a computer) in the form of a compiler that accepts a specification of an asynchronous system (specifically a Term Rewriting System, TRS), and outputs a representation of a circuit synthesis that implements a valid behavior of the asynchronous system in a clocked (i.e., synchronous) circuit. In some examples, the output is an intermediate form that includes specification and/or instructions that are further processed, for example, using circuit layout tools to form a representation of physical circuits that are fabricated to operate according the to asynchronous circuit specification. In some examples, specifications of separate parts of a circuit are processed separately (e.g., at different times and/or on different computers), and the outputs of the processing are combined, for example, using circuit layout tools, to form a representation of an overall physical circuit. In some examples, the interfaces to these separate parts make use of the (valid, changed, data) signal triples enabling integration of the parts without requiring modification or customization of the parts to operate together. In some embodiments, the software is embodied on computer-readable media (e.g., disks) that store the instructions that are executed on a data processing system to produce the corresponding output.

Note that in some implementations, one or more rules may be implemented in software, for example, for execution on general processing processors (e.g., on processor cores on a physical chip or in an associated processor chip) or a special purpose sequencer or microcontroller, and execution of the rules generally take multiple cycles. The approached described above, for example, using signally triples, enable the software implemented rules to be integrated with rules implemented with dedicated circuitry and/or scheduling and/or reservation circuitry.

It is to be understood that the foregoing description is intended to illustrate and not to limit the scope of the invention, which includes the scope of the appended claims. Many other implementations of the invention other than those described above are within the invention.

What is claimed is:

1. A method for designing a synchronous digital system comprising:
    accepting a specification of an asynchronous system, including accepting a specifications for each rule in a plurality of rules, the specification of each rule including a specification of a guard for determining when the rule may be applied, and a specification of an action that is performed as an atomic operation when the rule is applied; and
    processing the specification of the asynchronous system to form a corresponding specification of a synchronous digital system for operation according to a clock, including forming a specification of a scheduling circuit and specifications of circuits implementing a guard and action of each of the plurality of rules;
    wherein the plurality of rules includes at least some multi-cycle rules, and for each of the multi-cycle rules, the specification of the circuit implementing the multi-cycle rule includes a specification of a circuit implementing the action for the rule in a manner that may require multiple clock cycles to complete its action; and
    wherein the scheduling circuit includes logic for selecting rules to initiate according to guard values for the rules such that multiple multi-cycle rules may be active in one clock cycle.

2. The method of claim 1 wherein the asynchronous system specification includes a specification of a Term Rewriting System (TRS).

3. The method of claim 1 wherein the logic for selecting the rules is configured to inhibit initiating rules that conflict in their access to state elements with rules that are still active from being initiated in a previous clock cycle.

4. The method of claim 1 wherein the specification of the asynchronous system defines atomic actions and constraints on allowable sequences of the atomic actions, and
    wherein processing the specification of the asynchronous system to form a corresponding specification of a synchronous digital system comprises for each action of a plurality of actions, determining a specification of a logic circuit for implementing the definition of the action;
    wherein the scheduling circuit is configured to maintain the constraint on the allowable sequences of the atomic actions and in at least some clock cycles schedules use of multiple of the logic circuits for the actions; and
    wherein processing the specification of the asynchronous system to form a corresponding specification of a synchronous digital system further comprises modifying the specification of the logic circuit for implementing one of the actions by inserting or by removing a delay register on a signal path in the logic circuit, without requiring modification of the specification of the scheduling circuit to maintain the constrain on allowable actions.

5. The method of claim 4 wherein the determined logic circuits for implementing the actions and the determined logic circuits for scheduling the actions permit inserting and removing of delay registers in the signal paths of the circuits for implementing the actions without violating the constraint on the allowable sequences of actions.

6. The method of claim 1 wherein the specifications of circuits implementing a guard and action for each of the plurality of rules comprises:

specifications of a plurality of guard logic circuits, each of the guard logic circuits being associated with a corresponding action, and configured to accept state values and determine a ready signal a representative of whether the action may be performed; and a specification of state update logic corresponding to each of the actions configured to determine a commit ready signal representative of a condition that values determined by the update logic are ready to be committed to the state;

wherein the specification of the scheduling circuit includes a specification of a scheduling circuit configure to, at each clock cycle, accept the determined ready signals for the guard logic circuits and the commit ready signals from the update logic circuits, and use said accepted signals to determine (a) signals representative of which of the actions are active, and (b) commit signals representative of whether results of completed actions to be committed as state values; and wherein the specifications of circuits implementing a guard and action for each of the plurality of rules includes a specification of circuitry for updating the state according to the determined commit signals.

7. The method of claim 6 wherein the scheduling circuit is configured to determine the signals representative of which rules are active such that at least some rules are active for multiple clock cycles to perform an action and multiple rules are active during at least some clock cycles.

8. The method of claim 1 wherein the circuits implementing a guard and action for each of the plurality of rules comprise:

a plurality of data paths, each path being associated with a value, each path being implemented as a tuple of signal paths including a first path representing the value, a second path representing an indicator of whether the value on the first path is valid, and a third path representing a change in the value; and a plurality of functional elements, each element accepting one or more of the tuples of signal paths as inputs and providing one or more of the tuples as outputs.

9. The method of claim 8 wherein at least some of the functional elements includes a clocked register element.

10. Software tangibly stored on a computer-readable medium comprising instructions for causing a data processing system to:

accept a specification of an asynchronous system, including accepting a specifications for each rule in a plurality of rules, the specification of each rule including a specification of a guard for determining when the rule may be applied, and a specification of an action that is performed as an atomic operation when the rule is applied; and process the specification of the asynchronous system to form a corresponding specification of a synchronous digital system for operation according to a clock, including forming a specification of a scheduling circuit and specifications of circuits implementing a guard and action of each of the plurality of rules;

wherein the plurality of rules includes at least some multi-cycle rules, and for each of the multi-cycle rules, the specification of the circuit implementing the multi-cycle rule includes a specification of a circuit implementing the action for the rule in a manner that may require multiple clock cycles to complete its action; and wherein the scheduling circuit includes logic for selecting rules to initiate according to guard values for the rules such that multiple multi-cycle rules may be active in one clock cycle.

* * * * *